(12) United States Patent
Hwang et al.

(10) Patent No.: US 11,642,987 B2
(45) Date of Patent: May 9, 2023

(54) SLIDING UNIT FOR VEHICLE

(71) Applicants: HYUNDAI MOTOR COMPANY, Seoul (KR); KIA MOTORS CORPORATION, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 259 days.

(21) Appl. No.: 17/154,007

(22) Filed: Jan. 21, 2021

(65) Prior Publication Data

US 2022/0063452 A1 Mar. 3, 2022

(30) Foreign Application Priority Data

Sep. 3, 2020 (KR) .................. 10-2020-0112334

(51) Int. Cl.
*B60N 2/08* (2006.01)
*B60N 2/90* (2018.01)
*B60N 2/07* (2006.01)

(52) U.S. Cl.
CPC ............ *B60N 2/08* (2013.01); *B60N 2/0725* (2013.01); *B60N 2/919* (2018.02); *B60N 2002/924* (2018.02); *B60N 2002/952* (2018.02)

(58) Field of Classification Search
CPC ........ B60N 2/08; B60N 2/0725; B60N 2/919; B60N 2002/924; B60N 2002/952; B60N 2/07
See application file for complete search history.

(56) References Cited

U.S. PATENT DOCUMENTS

| | | | |
|---|---|---|---|
| 9,219,359 B2 | 12/2015 | Sekino et al. | |
| 9,381,876 B2 | 7/2016 | Terada et al. | |
| 9,573,536 B2 | 2/2017 | Katou et al. | |
| 2014/0167742 A1* | 6/2014 | Moore | G01R 33/0088 324/207.13 |
| 2018/0334054 A1 | 11/2018 | Higuchi et al. | |
| 2019/0009694 A1 | 1/2019 | Nolte et al. | |

(Continued)

FOREIGN PATENT DOCUMENTS

| | | | |
|---|---|---|---|
| CN | 207106248 U | * | 3/2018 |
| JP | 2018-134972 A | | 8/2018 |
| JP | 2019-189154 A | | 10/2019 |

(Continued)

OTHER PUBLICATIONS

Korean Office Action dated Nov. 17, 2021, issued in corresponding Korean Patent Application No. 10-2020-0112334.

*Primary Examiner* — Milton Nelson, Jr.
(74) *Attorney, Agent, or Firm* — Morgan, Lewis & Bockius LLP

(57) ABSTRACT

A sliding unit for a vehicle, the sliding unit may include a rail provided on the vehicle; a fixing portion formed of a material through which magnetism is flowable and provided along a direction in which the rail extends; a moving portion that is slidable along the rail; and a magnetic module provided in the moving portion, disposed toward the fixing portion, and selectively locked to the fixing portion by a magnetic path to selectively fix the moving portion to the rail.

15 Claims, 5 Drawing Sheets

(56) References Cited

U.S. PATENT DOCUMENTS

2020/0198502 A1  6/2020  Jeong et al.

FOREIGN PATENT DOCUMENTS

| KR | 10-1997-0036571 | A  |   | 7/1997  |             |
|----|-----------------|----|---|---------|-------------|
| KR | 100194276       | B1 | * | 6/1999  |             |
| KR | 20-2000-0003170 | U  |   | 2/2000  |             |
| KR | 10-1468617      | B1 |   | 12/2014 |             |
| KR | 10-2020-0058186 | A  |   | 5/2020  |             |
| KR | 10-2020-0076884 | A  |   | 6/2020  |             |
| WO | WO-2006000287   | A1 | * | 1/2006  | ... B60N 2/002 |

\* cited by examiner

SLIDING UNIT FOR VEHICLE

CROSS REFERENCE TO RELATED APPLICATION

The present application claims priority to Korean Patent Application No. 10-2020-0112334, filed Sep. 3, 2020, the entire contents of which is incorporated herein for all purposes by this reference.

BACKGROUND OF THE INVENTION

Field of the Invention

The present invention relates to a sliding unit for a vehicle in which a moving portion is movable along a rail and is locked or unlocked on the rail according to a magnetic path of a magnetic module provided in the moving portion, in the moving portion to which a seat or a console may be coupled in the vehicle.

Description of Related Art

In a vehicle, a seat may be adjusted in a front and rear direction so that a passenger fits the seat to his or her physical condition or secures space before and after the seat. As a traditional method, there is a method in which the seat slides in the front and rear direction along a rail provided on a floor of the vehicle by the manual lever manipulation of the passenger, and the seat is fixed after sliding, and recently, various electric seats that slide back and forth by pressing a button are also being developed.

The electric seats largely require a drive system and a locking mechanism. The existing drive system and locking apparatus have a complex structure and occupy a large space accordingly, and a wiring structure for power supply is also followed.

Therefore, there is a demand for an electric rail that not only occupies a minimum space with a simple structure and may easily supply power, but also may be easily used for various portions of the vehicle such as a console other than the seat.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a sliding unit for a vehicle which may be widely used inside the vehicle because a moving portion slides along a simple and slim rail and may be locked or unlocked on the rail by implementing a locking mechanism using a magnetic module, and may be coupled to various apparatus other than a seat.

According to various exemplary embodiments of the present invention, a sliding unit for a vehicle, the sliding unit includes: a rail provided on the vehicle; a fixing portion formed of a material through which magnetism is flowable and provided along a direction in which the rail extends; a moving portion that is slidable along the rail; and a magnetic module provided in the moving portion, mounted toward the fixing portion, and selectively locked to the fixing portion by a magnetic path to selectively fix the moving portion to the rail.

The magnetic module may be configured with a fixed permanent magnet that has an annular shape and is in contact with the fixing portion and provided toward the fixing portion in the magnetic module, and an electromagnet provided on an opposite side of the fixing portion in the magnetic module, and may be locked to or unlocked from the fixing portion according to a change in a polarity of the electromagnet.

When the magnetic module and the fixing portion together form the magnetic path according to the polarity of the electromagnet, the magnetic module may be locked to the fixing portion, and when the magnetic path is formed only in the magnetic module according to the polarity of the electromagnet, the magnetic module may be unlocked from the fixing portion.

The magnetic module may be provided with a rotating permanent magnet that rotates based on a rotation axis thereof, and the rotating permanent magnet may be rotated when a direction of the magnetic path flowing through the magnetic module is changed to reinforce a magnetic force of the magnetic path flowing through the magnetic module.

The rail may include a rack gear extending in a longitudinal direction on one side, and one side of the moving portion is provided with a pinion gear engaged with the rack gear, so that the moving portion may slide along the rail when the pinion gear rotates.

The rail may be provided with a cable veyor, and the cable veyor may have one end portion configured to be connected to a power supply of the vehicle and extending along the rail, and the other end portion bent and connected to one end portion of the moving portion to thereby supply power to the moving portion.

The rail may be provided with a cable veyor, and the cable veyor may have one end portion configured to be connected to a power supply of the vehicle at an end portion of the rack gear and extending along one side of the rail in an opposite direction from which the rack gear extends, and the other end portion bent and connected to one end portion of the moving portion to thereby supply power to the moving portion.

The moving portion may have a pinion gear located at the other end portion opposite to one end portion connected to the cable veyor, and the magnetic module provided at a point between one end portion of the moving portion and the other end portion thereof.

The rail may be configured with a bottom surface and both side walls to form an internal space, the fixing portion may be provided on the bottom surface, and the moving portion may be disposed in the internal space of the rail.

The moving portion is provided with a sliding roller rotatably supported by the bottom surface of the rail, so that top and bottom positions of the moving portion may be regulated by the sliding roller when the moving portion slides.

The moving portion is provided with a guide roller rotatably supported by at least one of the first and second side walls of the rail, so that left and right positions of the moving portion may be regulated by the guide roller when the moving portion slides.

The rail may be provided with a rail cover extending in a longitudinal direction of the rail at upper end portions of the side walls, a slit hole extending in the longitudinal direction may be formed in the rail cover, a driving portion may be provided above the rail cover to provide a driving force to the moving portion, and the driving portion and the moving portion may be connected by a connection portion penetrating through the slit hole.

The rail may be provided on a floor of the vehicle, and a seat may be coupled to the moving portion to slide along the rail on the floor of the vehicle.

The rail may be provided on a floor of the vehicle, and a seat may be coupled to the connection portion to be mounted above the rail cover, the driving portion may be located in the seat, and the seat may slide along the rail on the floor of the vehicle.

The rail may be provided on a floor of the vehicle, and a console may be coupled to the moving portion to slide along the rail on the floor of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
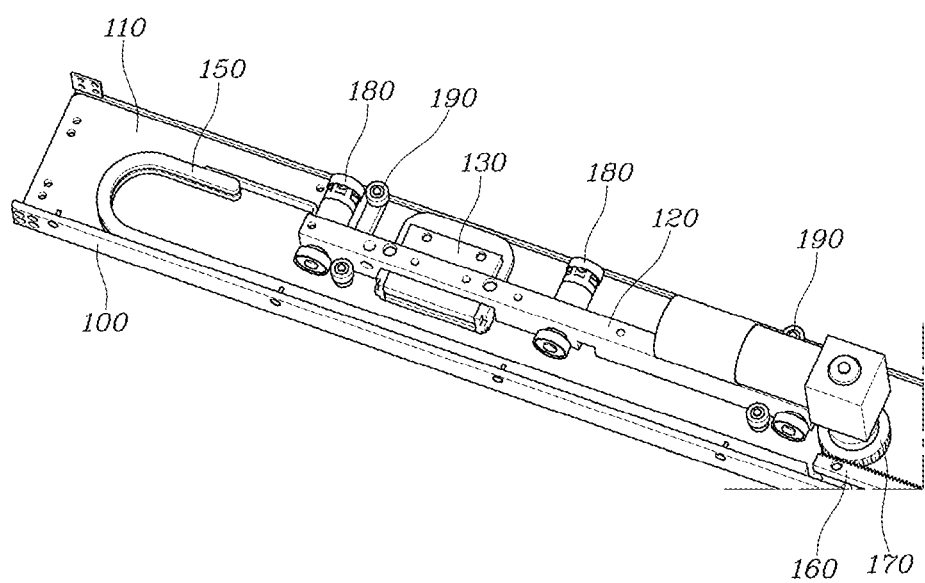
FIG. 1 is a view exemplarily illustrating a state in which a rail and a moving portion of a sliding unit for a vehicle according to various exemplary embodiments of the present invention are coupled.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
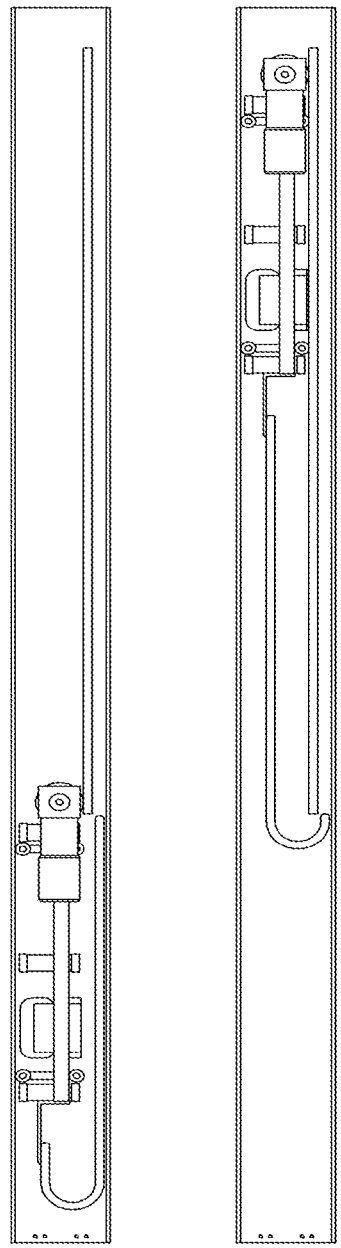
FIG. 2 is a view exemplarily illustrating a state in which the moving portion of the sliding unit for a vehicle according to various exemplary embodiments of the present invention slides to the rearmost side or the foremost side thereof.
Figure 3:
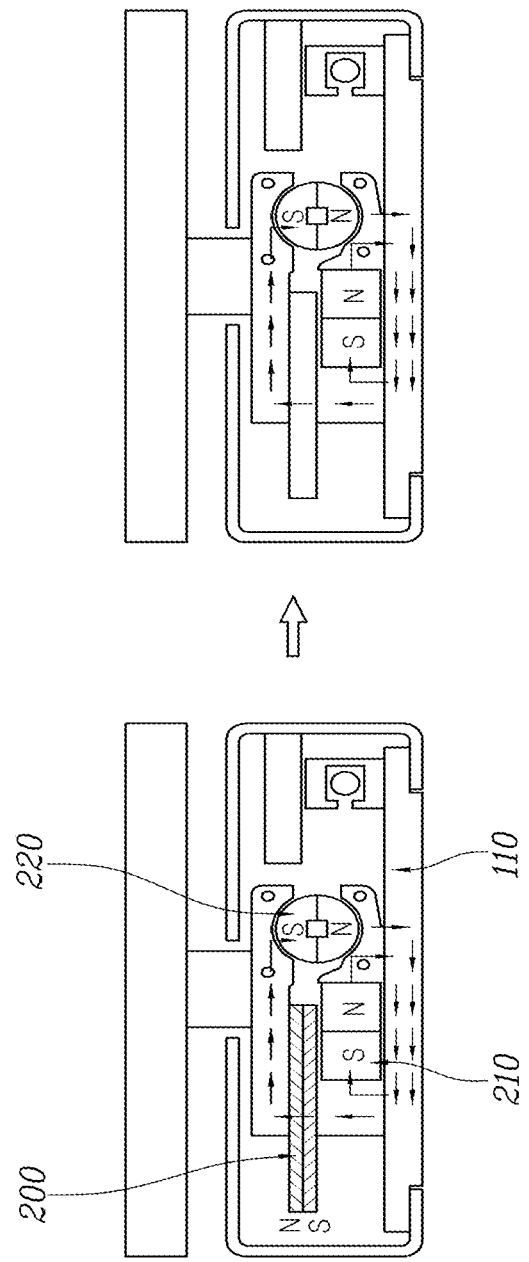
FIG. 3 is a view exemplarily illustrating a magnetic module and a fixing portion when the moving portion is fixed to the rail by applying a current to the magnetic module of the sliding unit for a vehicle according to various exemplary embodiments of the present invention.
Figure 4:
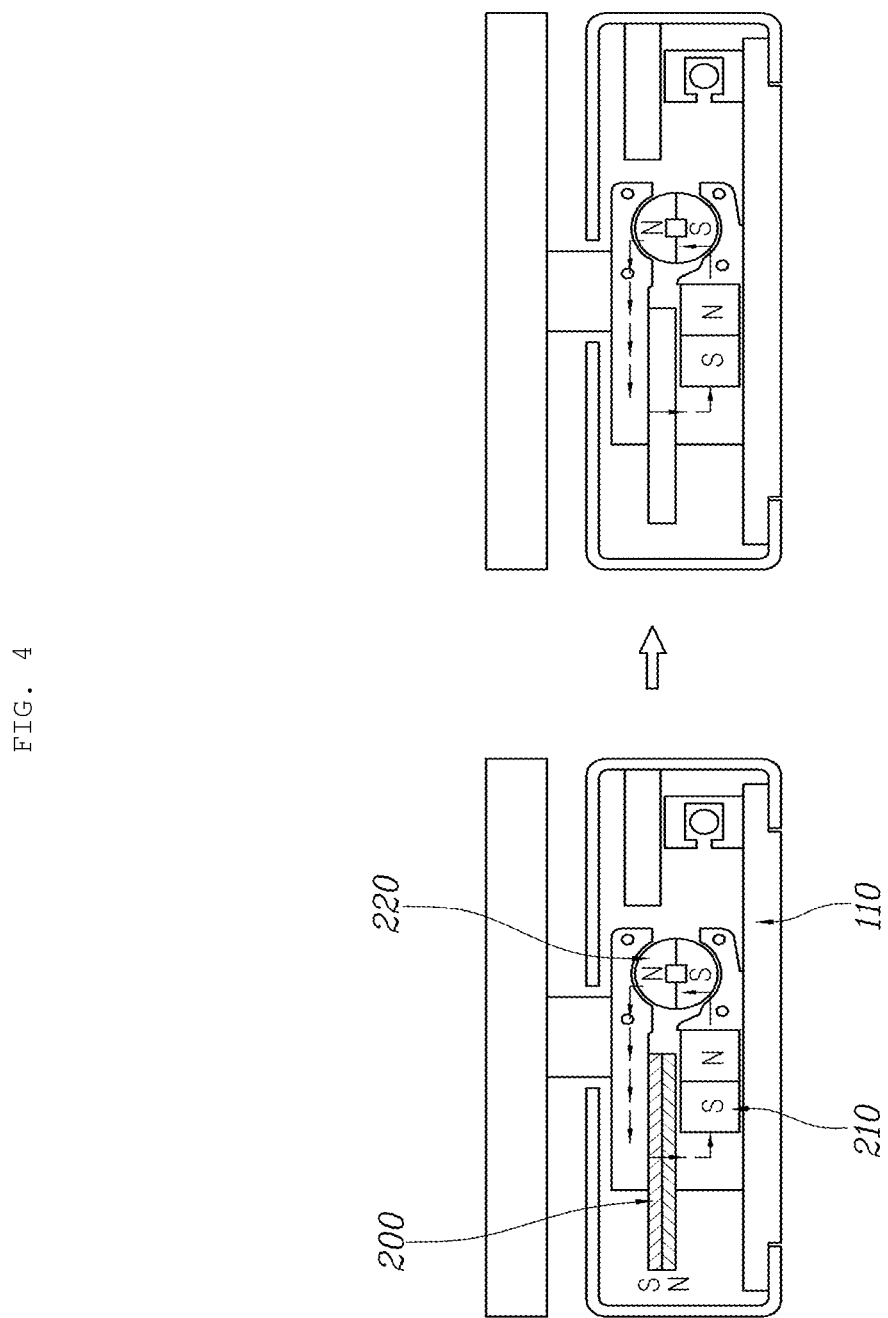
FIG. 4 is a view exemplarily illustrating the magnetic module and the fixing portion when the moving portion is separated from the rail by applying the current to the magnetic module of the sliding unit for a vehicle according to various exemplary embodiments of the present invention.
Figure 5:
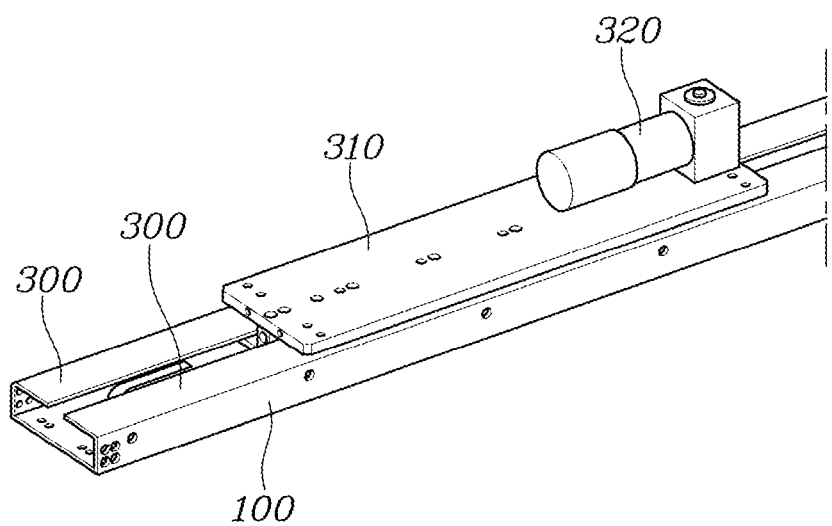
FIG. 5 is a view exemplarily illustrating a state in which a rail cover and a driving portion of the sliding unit for a vehicle according to various exemplary embodiments of the present invention are coupled.

FIG. 1 is a view exemplarily illustrating a state in which a rail and a moving portion of a sliding unit for a vehicle according to various exemplary embodiments of the present invention are coupled. FIG. 2 is a view exemplarily illustrating a state in which the moving portion of the sliding unit for a vehicle according to various exemplary embodiments of the present invention is slid to the rearmost side or the foremost side thereof. FIG. 3 is a view exemplarily illustrating a magnetic module and a fixing portion when the moving portion is fixed to the rail by applying a current to the magnetic module of the sliding unit for a vehicle according to various exemplary embodiments of the present invention. FIG. 4 is a view exemplarily illustrating the magnetic module and the fixing portion when the moving portion is separated from the rail by applying the current to the magnetic module of the sliding unit for a vehicle according to various exemplary embodiments of the present invention. FIG. 5 is a view exemplarily illustrating a state in which a rail cover and a driving portion of the sliding unit for a vehicle according to various exemplary embodiments of the present invention are coupled.

FIG. 1 is a view exemplarily illustrating a state in which a rail and a moving portion of a sliding unit for a vehicle according to various exemplary embodiments of the present invention are coupled. FIG. 2 is a view exemplarily illustrating a state in which the moving portion of the sliding unit for a vehicle according to various exemplary embodiments of the present invention is slid to the rearmost side or the foremost side thereof. A sliding unit for a vehicle according to various exemplary embodiments of the present invention includes a rail 100 provided on the vehicle; a fixing portion 110 formed of a material through which magnetism may flow and provided along a direction in which the rail 100 extends; a moving portion 120 that slides along the rail 100; and a magnetic module 130 provided in the moving portion 120, disposed toward the fixing portion 110, and selectively locked to the fixing portion 110 by a magnetic path to selectively fix the moving portion 120 to the rail 100. The rail 100 may extend in a straight line toward a predetermined direction from a floor of the vehicle, such as a longitudinal direction of the vehicle or a width direction of the vehicle.

The sliding unit for a vehicle according to various exemplary embodiments of the present invention has a simple structure and minimizes a space occupied by the rail as a locking mechanism using a magnetic module is employed, facilitating efficient use of the space inside the vehicle. A locking mechanism of an existing rail includes a method using a lead screw and a forking method. When the seat is locked in the present way, a height of the rail is excessive, such as 47 mm or 57 mm. When the height of the rail is excessive, the rail occupies a large amount of limited space on the floor of the vehicle, making efficient use of the space difficult. Therefore, the sliding unit for a vehicle according to various exemplary embodiments of the present invention employs a new locking mechanism using a magnetic module to implement a rail having a slim structure with a rail height of 30 mm.

Furthermore, in the sliding unit for a vehicle according to various exemplary embodiments of the present invention, the rail 100 includes a rack gear 160 extending in the longitudinal direction on one side, and one side of the moving portion 120 is provided with a pinion gear 170 engaged with the rack gear 160, so that the moving portion 120 may slide along the rail 100 when the pinion gear 170 rotates.

In other words, the rack gear 160 is provided on one side of the rail 100 along the rail 100, and a pinion gear 170 is provided at the foremost side of one side of the moving portion 120 so that the moving portion 120 moves along the rail 100 while the pinion gear 170 rotates and is engaged with the rack gear 160. Accordingly, by controlling the pinion gear 170, it is possible to easily control the movement of the moving portion 120, and by employing such a gear structure, it is possible to prevent the magnetic module 130 from being pushed in the longitudinal direction of the vehicle in the locking mechanism using the magnetic module 130.

Meanwhile, in the sliding unit for a vehicle according to various exemplary embodiments of the present invention, the rail 100 is provided with a cable veyor 150, and the cable veyor 150 has one end portion configured to be connected to a power supply of the vehicle and extending along the rail 100, and the other end portion bent and connected to one end portion of the moving portion 120, making it possible to supply power to the moving portion 120. Furthermore, the rail 100 is provided with the cable veyor 150, and the cable veyor 150 has one end portion connected to the power supply of the vehicle at an end portion of the rack gear 160 and extending along one side of the rail 100 in an opposite direction from which the rack gear 160 extends, and the other end portion bent and connected to one end portion of the moving portion 120, making it possible to supply power to the moving portion 120.

In the sliding unit for a vehicle according to various exemplary embodiments of the present invention, it is essential that power is supplied to the magnetic module 130 and a drive system for movement, and by use of the cable veyor 150, it is possible to smoothly supply the power while maintaining a slim rail structure. The cable veyor 150 may have one end portion connected to the power supply of the vehicle and the other end portion connected to a bracket protruding from one end portion of the moving portion 120, preventing a cable and continuously supplying the power as the moving portion 120 moves along the rail. Furthermore, when the cable veyor 150 is connected to the power supply of the vehicle at the end portion of the rack gear 160 provided on one side of the rail 100, the cable veyor 150 may extend to a wider range as the moving portion 120 moves along the rail 100, supplying the power to the moving portion 120.

Furthermore, in the sliding unit for a vehicle according to various exemplary embodiments of the present invention, the moving portion 120 may have a pinion gear 170 located at the other end portion opposite to one end portion connected to the cable veyor 150, and the magnetic module 130 provided at a point between one end portion of the moving portion 120 and the other end portion thereof. As the moving portion 120 has such a structure, the pinion gear 170 located at the foremost side of the moving portion 120 may move in the widest range as possible along the rack gear 160 provided on the rail 100, the magnetic module 130 is located at the rear of the pinion gear 170 to implement a locking mechanism, and the cable veyor 150 is connected to the protruding bracket at the rear of the magnetic module 130, smoothly supply the power to the moving portion 120 in a wide range. In other words, since the pinion gear 170 is located at the foremost of the moving portion 120, a stroke of the moving portion 120 may be maximally secured at the rear of the rack gear 160 according to a length of the moving portion 120 and a length of the cable veyor 150 connected to the moving portion 120.

Meanwhile, in the sliding unit for a vehicle according to various exemplary embodiments of the present invention, the rail 100 may be configured with a bottom surface and both side walls to form an internal space, the fixing portion 110 may be provided on the bottom surface, and the moving portion 120 may be disposed in the internal space of the rail 100. Therefore, the moving portion 120 may move along the rack gear 160 located on one side wall of the rail 100 in the internal space of the rail 100, and the magnetic module 130 may be locked or unlocked to the fixing portion 110 on the bottom surface.

The moving portion 120 is provided with a sliding roller 180 supported by the bottom surface of the rail 100 and rotated, so that the top portion and bottom positions of the moving portion 120 may be regulated by the sliding roller 180 when the moving portion 120 slides, and the moving portion 120 is provided with a guide roller 190 supported by the side wall of the rail 100 and rotated, so that the left and right positions of the moving portion 120 may be regulated by the guide roller 190 when the moving portion 120 slides.

The sliding roller 180 supports a lower end portion of the moving portion and is in contact with the bottom surface of the rail 100 to rotate as the moving portion 120 slides along the rail 100. The sliding roller 180 may be located at the foremost side of the moving portion 120 where the pinion gear 170 is located, at the rearmost side connected to the cable veyor 150, and at an intermediate point according to the length of the moving portion 120 to effectively support the moving portion 120. When the sliding roller 180 is located at the intermediate point, the magnetic module 130 is located at a point between the front and rear sliding rollers 180 to lock or unlock the moving portion 120 to or from the fixing portion 110.

The guide roller 190 may be located in a pair of left and right at the front and rear of the moving portion 120, and the guide roller 190 is supported by the side wall of the rail 100 or the rack gear 160 and is rotated to prevent left and right eccentricity of the moving portion 120.

FIG. 3 is a view exemplarily illustrating a magnetic module and a fixing portion when the moving portion is fixed to the rail by applying a current to the magnetic module of the sliding unit for a vehicle according to various exemplary embodiments of the present invention. FIG. 4 is a view exemplarily illustrating the magnetic module and the fixing portion when the moving portion is separated from the rail by applying the current to the magnetic module of the sliding unit for a vehicle according to various exemplary embodiments of the present invention. In the sliding unit for a vehicle according to various exemplary embodiments of the present invention, the magnetic module 130 may be configured with a fixed permanent magnet 210 that has an annular shape and is in contact with the fixing portion 110 and provided toward the fixing portion 110 in the magnetic module, and an electromagnet 200 provided on an opposite side of the fixing portion 110 in the magnetic module, and may be locked to or unlocked from the fixing portion 110 according to a change in a polarity of the electromagnet 200. In other words, the magnetic module 130 forms a magnetic path by applying a current to the electromagnet 200, and as a magnetic pole of the electromagnet 200 changes, the magnetic path formed in the magnetic module 130 changes.

Meanwhile, when the magnetic module 130 and the fixing portion 110 together form the magnetic path, the magnetic module 130 may be locked to the fixing portion 110, and when the magnetic path is formed only in the magnetic module 130, the magnetic module 130 may be unlocked from the fixing portion 110. As illustrated in FIG. 3, when a current is applied to the electromagnet 200 to form the magnetic pole of the electromagnet 200 at a portion adjacent to the fixed permanent magnet 210 with the same magnetic pole as the adjacent fixed permanent magnet 210, the magnetic path is formed to pass through the magnetic module 130 and the fixing portion 110 together, and accordingly, the magnetic module 130 is locked to the fixing portion 110. As illustrated in FIG. 4, when a current is applied to the electromagnet 200 to form the magnetic pole of the electromagnet 200 at a portion adjacent to the fixed permanent magnet 210 with a magnetic pole different from the adjacent fixed permanent magnet 210, the magnetic path is formed to pass only through the magnetic module 130 and not pass through the fixing portion 110, and accordingly, the magnetic module 130 is unlocked from the fixing portion 110.

Furthermore, even when the current is applied to the electromagnet 200 to form the magnetic path and the current application is stopped after the magnetic module 130 is locked to or unlocked from the fixing portion 110, the magnetic module 130 maintains a pre-formed magnetic path to maintain a state in which the magnetic module 130 is locked to or unlocked from the fixing portion 110. Therefore, in the case of implementing the locking mechanism in the rail using the magnetic module 130, since the current only needs to be supplied to the magnetic module 130 at the moment of locking or unlocking, there is an effect of minimizing power consumption.

Meanwhile, in the sliding unit for a vehicle according to various exemplary embodiments of the present invention, the magnetic module 130 is provided with a rotating permanent magnet 220 that rotates based on a rotation axis thereof, and the rotating permanent magnet 220 may be rotated when the direction of the magnetic path flowing through the magnetic module 130 is changed to reinforce a magnetic force of the magnetic path flowing through the magnetic module 130. When the magnetic path is formed in the magnetic module 130, the rotating permanent magnet 220 rotates according to a flow of instantaneous current, increasing a magnetic flux of the magnetic path. Accordingly, since the magnetic force of the magnetic path is reinforced, the fixing force during locking is improved by about twice as compared to a case where only the fixed permanent magnet 210 is used in the magnetic module 130.

In other words, when the magnetic module 130 is locked to or unlocked from the fixing portion 110 by the instantaneous current, the rotating permanent magnet 220 rotates by a shaft at the center portion of the rotating permanent magnet 220 as the magnetic path changes, so that the magnetic flux of the magnetic path may increase, and the magnetic module 130 may be easily locked to or unlocked from the fixing portion 110.

As illustrated in FIG. 3, when the magnetic module 130 applies the current to the electromagnet 200 so that the magnetic pole adjacent to the fixed permanent magnet 210 is formed as the same S pole as the pole of the fixed permanent magnet 210, the magnetic path flows in a clockwise direction based on the magnetic module 130, but the magnetic path passing through the magnetic module 130 and the fixing portion 110 is formed in a double manner. Accordingly, the rotating permanent magnet 220 rotates according to the magnetic path in the clockwise direction thereof, so that the S pole is disposed to face upward, and an N pole is disposed to face downward. As a result, even after the current application to the electromagnet 200, the magnetic flux generated by the fixed permanent magnet 210 and the magnetic flux generated by the rotating permanent magnet 220 are added to increase the magnetic flux, and the magnetic path is maintained to pass through the magnetic module 130 and the fixing portion 110 together so that the magnetic module 130 may be locked to the fixing portion 110.

Furthermore, as illustrated in FIG. 4, when the magnetic module 130 applies the current to the electromagnet 200 so that the magnetic pole adjacent to the fixed permanent magnet 210 is formed as the N pole different from the pole of the fixed permanent magnet 210, the magnetic path flows in a counterclockwise direction based on the magnetic module 130, but the magnetic path does not pass through the fixing portion 110 and flows only inside the magnetic module 130. Accordingly, the rotating permanent magnet 220 rotates according to the magnetic path in the counterclockwise direction thereof, so that the S pole is disposed to face downward, and the N pole is disposed to face upward As a result, even after the current application to the electromagnet 200 is stopped, the magnetic path is maintained to pass only through the magnetic module 130 so that the magnetic module 130 may be unlocked from the fixing portion 110.

FIG. 5 is a view exemplarily illustrating a state in which a rail cover and a driving portion of the sliding unit for a vehicle according to various exemplary embodiments of the present invention are coupled. In the sliding unit for a vehicle according to various exemplary embodiments of the present invention, the rail 100 may be provided with a rail cover 300 extending in the longitudinal direction at upper end portions of the side walls, a slit hole extending in the longitudinal direction may be formed in the rail cover 300, a driving portion 320 may be provided above the rail cover 300 to provide a driving force to the moving portion 120, and the driving portion 320 and the moving portion 120 may be connected by a connection portion 310 penetrating through the slit hole. The driving portion 320 located above the rail cover 300 transmits power to the pinion gear 170 of the moving portion 120 located in the internal space of the rail 100 so that the moving portion 120 slides along the rack gear 160 to move. Like the locking mechanism, the driving portion is a factor that has a great influence on the structure of the rail. If the driving portion is complicated and occupies a large space, the structure of the rail will be complicated and the height of the rail will be excessive. Therefore, in the sliding unit for a vehicle according to various exemplary embodiments of the present invention, the moving portion 120 and the magnetic module 130 occupying a minimum space, and the cable veyor 150 for supplying power may be located in the internal space of the rail 100, and the moving portion 120 may be connected to the driving portion 320 through the connection portion 310 penetrating through the slit hole provided in the rail cover 300, implementing a simple and slim rail 100.

Meanwhile, in the sliding unit for a vehicle according to various exemplary embodiments of the present invention, the rail 100 may be provided on the floor of the vehicle, and a seat may be coupled to the moving portion 120 to slide along the rail 100 on the floor of the vehicle. The rail 100 may be provided on the floor of the vehicle, and the seat may be coupled to the connection portion 310 to be mounted above the rail cover 300, the driving portion 320 may be located in the seat, and the seat may slide along the rail 100 on the floor of the vehicle. The sliding unit for a vehicle according to various exemplary embodiments of the present invention has the slim rail structure inside the vehicle, so that it may be used in a variety of ways in the vehicle, and may be typically used for a seat slide. The seat may be coupled to the connection portion 310 connected to the moving portion 120 to move as the moving portion 120 slides along the rail, and may be locked to or unlocked from the fixing portion 110 using the magnetic module 130, and the driving portion 320 may be located inside the seat to transmit the power to the moving portion 120 in a state which is not visible from the outside.

Furthermore, the rail 100 may be provided on the floor of the vehicle, and a console may be coupled to the moving portion 120 to slide along the rail 100 on the floor of the vehicle. Through the simple and slim structure of the sliding unit for a vehicle according to various exemplary embodiments of the present invention as described above, it is possible to implement the console or other in-vehicle apparatus as well as the seat simply coupled to the upper end portion of the rail 100 and slid.

Finally, when autonomous vehicles are commercialized in the future, a concept of the driver's seat will gradually disappear and the need to utilize an internal compartment of the vehicle will emerge. If the sliding unit for a vehicle according to various exemplary embodiments of the present invention is used, it is expected to be easy to secure a necessary space by simply sliding apparatuses such as the seat and the console in the vehicle.

According to the sliding unit for a vehicle according to various exemplary embodiments of the present invention, since the moving portion slides along the simple and slim rail and may be locked or unlocked on the rail by implementing the locking mechanism using the magnetic module, and may be coupled to various apparatuses other than the seat, the sliding unit for a vehicle may be widely used inside the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A sliding unit in a vehicle, the sliding unit including:
   a rail provided on the vehicle;
   a fixing portion formed of a material through which magnetism is flowable and provided along a direction in which the rail extends;
   a moving portion that is slidable along the rail; and
   a magnetic module provided in the moving portion, disposed toward the fixing portion, and selectively locked to the fixing portion by a magnetic path to selectively fix the moving portion to the rail.

2. The sliding unit of claim 1, wherein the magnetic module includes:
   a fixed permanent magnet that has an annular shape and is in contact with the fixing portion and provided toward the fixing portion in the magnetic module; and
   an electromagnet provided on an opposite side of the fixing portion in the magnetic module,
   wherein the magnetic module is locked to or unlocked from the fixing portion according to a change in a polarity of the electromagnet.

3. The sliding unit of claim 2,
   wherein when the magnetic module and the fixing portion together form the magnetic path according to the polarity of the electromagnet, the magnetic module is locked to the fixing portion, and
   wherein when the magnetic path is formed only in the magnetic module according to the polarity of the electromagnet, the magnetic module is unlocked from the fixing portion.

4. The sliding unit of claim 2,
   wherein the magnetic module is provided with a rotating permanent magnet that rotates based on a rotation axis thereof, and
   wherein the rotating permanent magnet is rotated when a direction of the magnetic path flowing through the magnetic module is changed to reinforce a magnetic force of the magnetic path flowing through the magnetic module.

5. The sliding unit of claim 1,
   wherein the rail is configured to be provided on a floor of the vehicle, and
   wherein a seat is coupled to the moving portion to slide along the rail on the floor of the vehicle.

6. The sliding unit of claim 1,
   wherein the rail is provided with a cable veyor, and
   wherein the cable veyor includes a first end portion configured to be connected to a power supply of the vehicle and extending along the rail, and a second end portion bent and connected to an end portion of the moving portion to thereby supply power to the moving portion.

7. The sliding unit of claim 1,
   wherein the rail is configured to be provided on a floor of the vehicle, and
   wherein a console is coupled to the moving portion to slide along the rail on the floor of the vehicle.

8. The sliding unit of claim 1,
   wherein the rail includes a bottom surface and first and second side walls to form an internal space,
   wherein the fixing portion is provided on the bottom surface, and
   wherein the moving portion is disposed in the internal space of the rail.

9. The sliding unit of claim 8, wherein the moving portion is provided with a guide roller rotatably supported by at least one of the first and second side walls of the rail, so that left and right positions of the moving portion are regulated by the guide roller when the moving portion slides.

10. The sliding unit of claim 8, wherein the moving portion is provided with a sliding roller rotatably supported by the bottom surface of the rail, so that top and bottom positions of the moving portion are regulated by the sliding roller when the moving portion slides.

11. The sliding unit of claim 8,
wherein the rail is provided with a rail cover extending in a longitudinal direction of the rail at upper end portions of the first and second side walls,
wherein a slit hole extending in the longitudinal direction is formed in the rail cover,
wherein a driving portion is provided above the rail cover to provide a driving force to the moving portion, and
wherein the driving portion and the moving portion are connected by a connection portion penetrating through the slit hole.

12. The sliding unit of claim 11,
wherein the rail is configured to be provided on a floor of the vehicle, and
wherein a seat is configured to be coupled to the connection portion to be disposed above the rail cover, the driving portion is located in the seat, and the seat is slidable along the rail on the floor of the vehicle.

13. The sliding unit of claim 1, wherein the rail includes a rack gear extending in a longitudinal direction on a side of the rail, and one side of the moving portion is provided with a pinion gear engaged with the rack gear, so that the moving portion slides along the rail when the pinion gear rotates.

14. The sliding unit of claim 13,
wherein the rail is provided with a cable veyor, and
wherein the cable veyor has a first end portion configured to be connected to a power supply of the vehicle at an end portion of the rack gear and extending along one side of the rail in an opposite direction from which the rack gear extends, and a second end portion bent and connected to one end portion of the moving portion to thereby supply power to the moving portion.

15. The sliding unit of claim 14, wherein the moving portion has a pinion gear located at a first end portion of the moving portion opposite to a second end portion of the moving portion connected to the cable veyor, and the magnetic module is provided at a point between the first end portion and the second end portion of the moving portion.

* * * * *